United States Patent
Menheere

(10) Patent No.: US 12,392,282 B2
(45) Date of Patent: Aug. 19, 2025

(54) CONSTANT VOLUME COMBUSTOR FOR GAS TURBINE ENGINE

(71) Applicant: Pratt & Whitney Canada Corp., Longueuil (CA)

(72) Inventor: Dave Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 31 days.

(21) Appl. No.: 18/127,155

(22) Filed: Mar. 28, 2023

(65) Prior Publication Data

US 2024/0328349 A1    Oct. 3, 2024

(51) Int. Cl.
  *F02C 5/08*    (2006.01)
  *F23R 7/00*    (2006.01)

(52) U.S. Cl.
  CPC ............ *F02C 5/08* (2013.01); *F23R 7/00* (2013.01); *F05D 2240/35* (2013.01)

(58) Field of Classification Search
  CPC ............ F02C 5/08; F02C 5/06; F23R 7/00
  See application file for complete search history.

(56) References Cited

U.S. PATENT DOCUMENTS

| | | | | |
|---|---|---|---|---|
| 3,005,306 A * | 10/1961 | Bush | ............ | F02B 71/04 60/613 |
| 4,815,294 A | 3/1989 | David | | |
| 8,127,544 B2 | 3/2012 | Schwiesow et al. | | |
| 9,062,601 B1 | 6/2015 | Stude | | |
| 11,193,424 B2 | 12/2021 | Roda | | |
| 2008/0271711 A1 * | 11/2008 | Cheeseman | ............ | F02B 71/00 123/46 E |
| 2010/0192764 A1 | 8/2010 | Ries | | |
| 2015/0308301 A1 * | 10/2015 | McConville | ............ | F01L 1/34 123/90.15 |
| 2018/0306110 A1 * | 10/2018 | Ohishi | ............ | F02C 5/08 |

FOREIGN PATENT DOCUMENTS

| | | |
|---|---|---|
| DE | 19625182 A1 | 1/1998 |
| GB | 27724 A | 4/1908 |
| JP | 55116025 A | 9/1980 |
| WO | 2020141981 A1 | 7/2020 |

OTHER PUBLICATIONS

Extended European Search Report for European Application No. 24167071.0 mailed Aug. 1, 2024.

* cited by examiner

*Primary Examiner* — Gerald L Sung
(74) *Attorney, Agent, or Firm* — Carlson, Gaskey & Olds, P.C.

(57) ABSTRACT

A combustor assembly for a turbine engine includes a combustor assembly where a first combustion space is defined between a first closed end of a combustion chamber and a first piston, a second combustion space is defined between a second closed end of the combustion chamber and a second piston and a center combustion space is defined between the first piston and the second piston. An air inlet assembly provides for communication of inlet air to the first combustion space, the second combustion space and the center combustion space. First, second and center injectors are provided to inject fuel into a corresponding one of the first combustion space, the second combustion space, and the center combustion space. An exhaust outlet communicates an exhaust gas flow generated in each of the first combustion space, the second combustion space and the center combustion space to a turbine section.

17 Claims, 5 Drawing Sheets

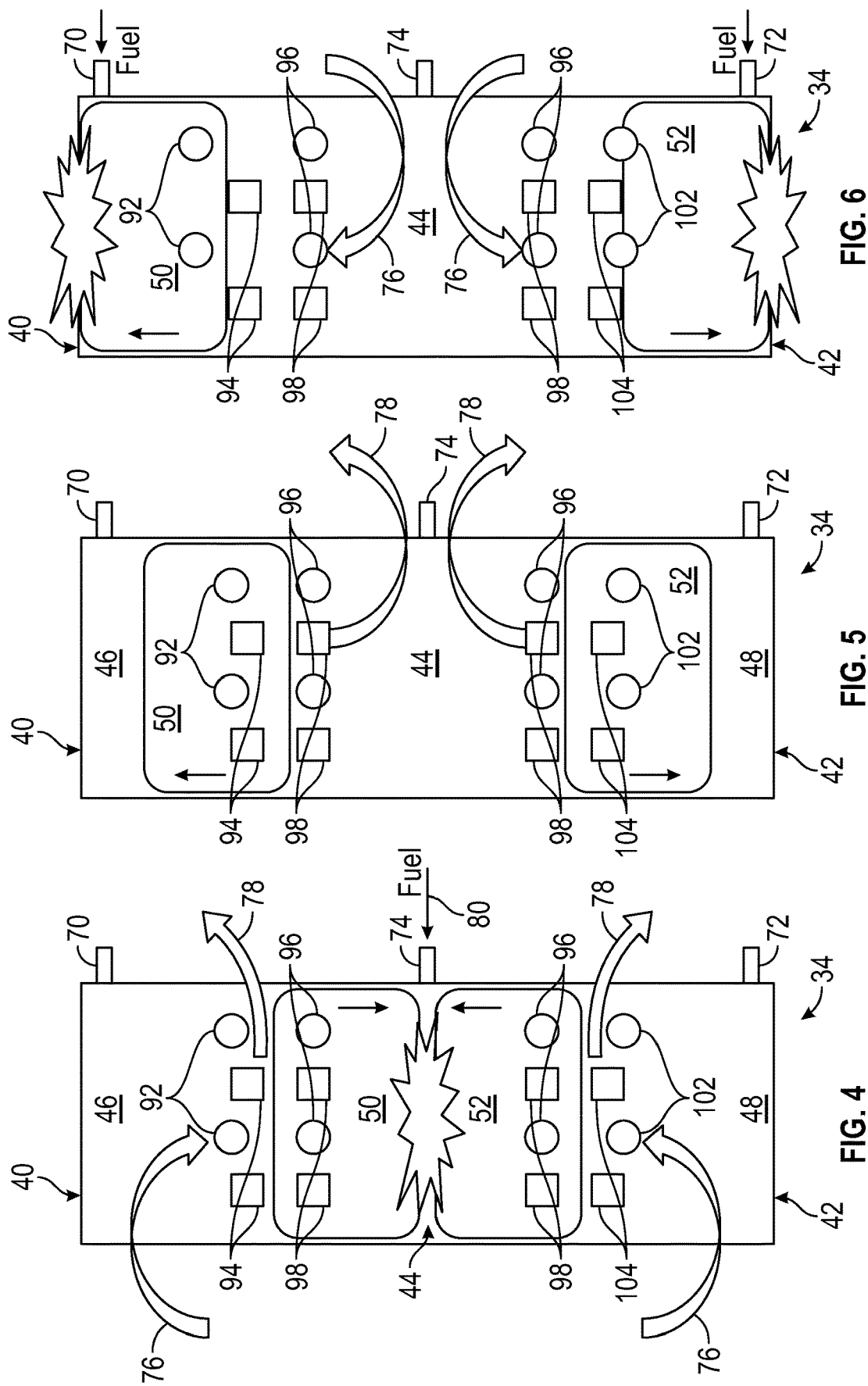

CONSTANT VOLUME COMBUSTOR FOR GAS TURBINE ENGINE

TECHNICAL FIELD

The present disclosure relates generally to a combustor assembly for a gas turbine engine that includes pistons movable within a constant volume combustion chamber.

BACKGROUND

A turbine engine includes a compressor section where inlet air is compressed and delivered into the combustion section where a high-energy exhaust gas flow is generated and expanded through a turbine section. The high-energy exhaust gas flow expands through the turbine section to generate power utilized to drive the compressor and the fan section. A constant volume combustor utilizes heat generated by compression of inlet air to ignite a fuel mixture and generate an exhaust gas flow. Free pistons that are movable within the combustion chamber compress the inlet air to generate the heat required to ignite the injected fuel. Opposing movement of the pistons reduces or eliminates vibration while providing the desired gas flow to drive the turbine section.

SUMMARY

A combustor assembly for a turbine engine according to a disclosed example embodiment includes, among other possible things, at least one combustion chamber that is closed at a first end and at a second end, a first piston and a second piston moveable within the combustion chamber, wherein a first combustion space is defined between the first end and the first piston, a second combustion space is defined between the second end and the second piston and a center combustion space is defined between the first piston and the second piston. An air inlet assembly is provided where an inlet airflow is communicated to the first combustion space, the second combustion space and the center combustion space. A first injector is configured to inject fuel into the first combustion space, a second injector is configured to inject fuel in to the second combustion space, and a center injector is configured to inject fuel into the center combustion space. An exhaust outlet assembly is configured for receiving an exhaust gas flow generated in each of the first combustion space, the second combustion space and the center combustion space.

A turbine engine assembly according to another disclosed example embodiment includes, among other possible things, a compressor section where inlet air is compressed to generate a core airflow, and a combustor assembly where the core airflow is mixed with fuel and ignited to generate an exhaust gas flow. The combustor assembly includes at least one combustion chamber closed at a first end and at a second end and a first piston and a second piston both movable within the combustion chamber. A first combustion space is defined between the first end and the first piston, a second combustion space is defined between the second end and the second piston and a center combustion space is defined between the first piston and the second piston. A turbine section is configured to receive the exhaust gas flow from the combustor section to generate shaft power.

A method of operating a turbine engine assembly according to another disclosed example embodiment includes, among other possible things, communicating a core airflow to a combustion chamber between a first piston and a second piston, compressing the core airflow within the combustion chamber in a center combustion space between the first piston and the second piston, injecting fuel into the center combustion space at a predefined time to ignite the fuel and generate a first exhaust gas flow and drive the first piston and the second piston apart from each other toward a corresponding first closed end and second closed end, compressing the core airflow within a first combustion space with the first piston and within a second combustion space with the second piston, injecting fuel into the first combustion space and the second combustion space at a predefined time to ignite the fuel and generate a second exhaust gas flow, and communicating the first gas flow and the second exhaust gas flow to a turbine section to generate power.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a schematic view of a combustion chamber with pistons in a combustion position.

FIG. 5 is another schematic view of the combustion chambers with pistons in an exhaust position.

FIG. 6 is another schematic view of the combustion chamber with pistons in another combustion position.

DETAILED DESCRIPTION

Figure 1:
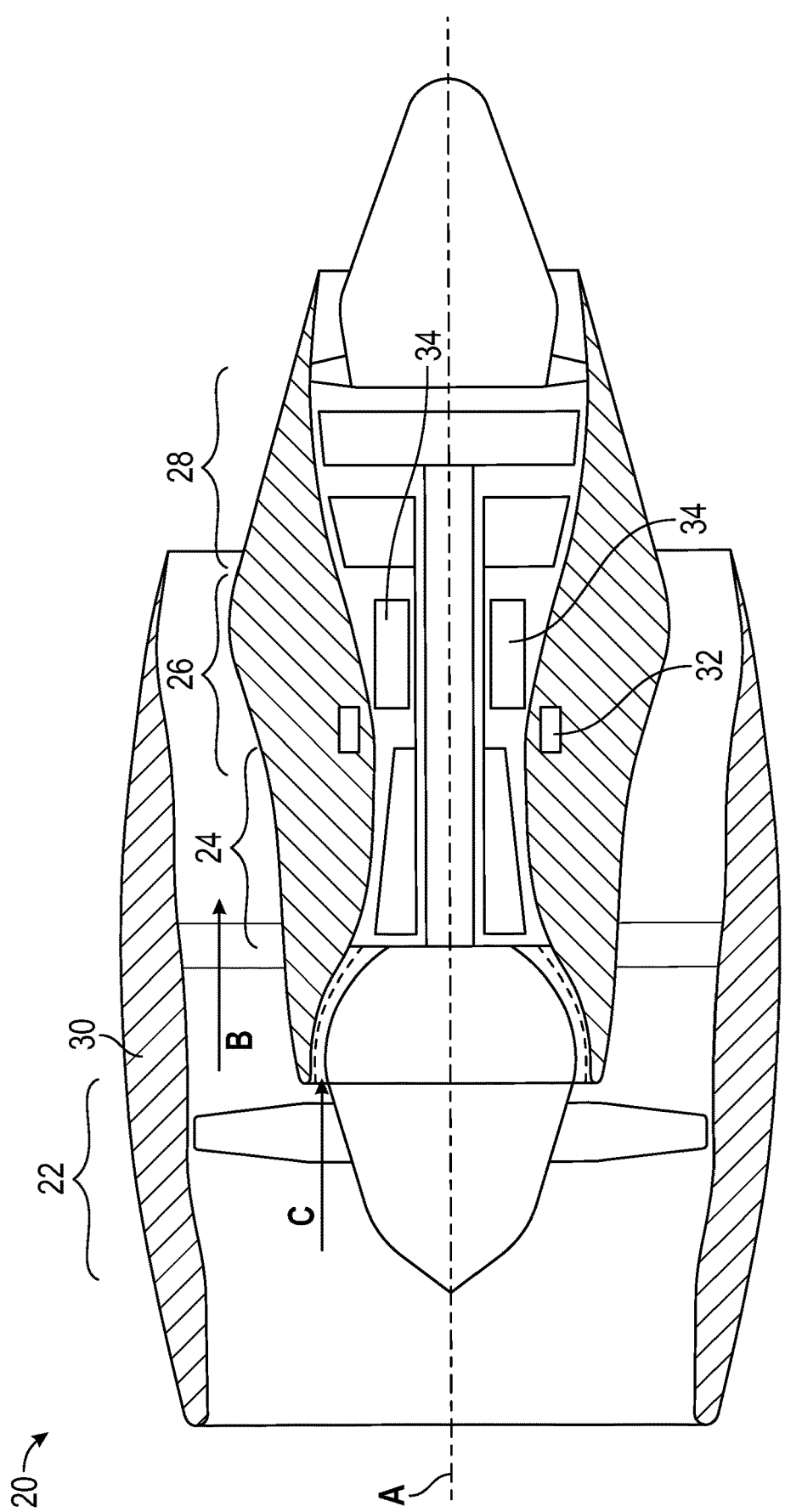
FIG. 1 is a schematic view of an example gas turbine engine.

FIG. 1 schematically illustrates a gas turbine engine 20. The example gas turbine engine 20 includes a combustor assembly 26 that utilizes double acting free pistons disposed within a constant volume combustion chamber 34 to generate a high energy exhaust gas flow. Two combustion events occur to generate the exhaust gas flow for each single cycle of the free pistons within the chamber 34.

The engine 20 is illustrated by way of example as a turbofan that generally incorporates a fan section 22, a compressor section 24, the combustor assembly 26 and a turbine section 28 arranged along an engine longitudinal axis A. The fan section 22 drives air along a bypass flow path B in a bypass duct defined within a nacelle 30. The compressor section 24 drives air along a core flow path C into the combustor assembly 26. In the combustor assembly 26, compressed air is mixed with fuel from a fuel system 32 and burnt to generate the high energy exhaust gas flow that expands through the turbine section 28 to generate shaft power.

Although the disclosed non-limiting example embodiment is depicted as a turbofan turbine engine for use in aircraft propulsion, it should be understood that the concepts described herein are not limited to use with turbofans as the teachings may be applied to other types of gas turbine engine architectures and applications.

Figure 2:
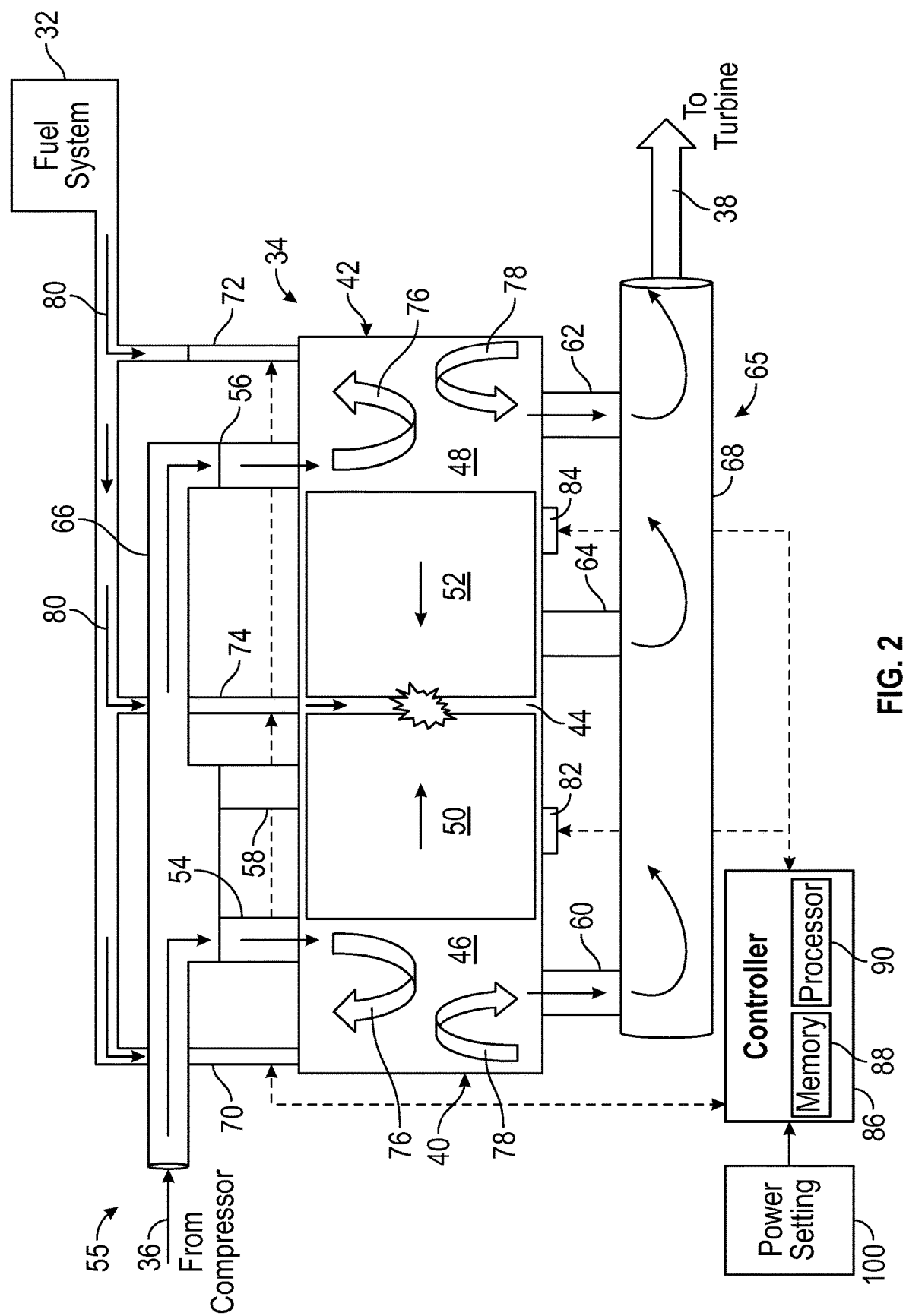
FIG. 2 is a schematic cross-sectional view of an example combustion chamber.

Referring to FIG. 2, an example combustion chamber 34 is shown schematically and is closed at a first end 40 and at a second end 42. A first piston 50 and a second piston 52 are moveable within the combustion chamber 34 to define different combustion spaces. In one example embodiment, a first combustion space 46 is defined between the first end 40 and the first piston 50. A second combustion space 48 is defined between the second end 42 and the second piston 52. A center combustion space 44 is defined between the first piston 50 and the second piston 52. The combustion spaces 44, 46 and 48 expand and contract with movement of the pistons 50, 52 to compress a core airflow 36 and expel generated exhaust gases 78.

The combustion chamber 34 includes an air inlet assembly 55 where an inlet airflow 76 is communicated into the different combustion spaces 44, 46, 48. In the disclosed example, the air inlet assembly 55 includes an inlet manifold 66 that communicates a compressed core airflow 36 to a first inlet 54, a second inlet 56 and a center inlet 58. The first inlet 54 communicates core airflow 36 to the first combustion space 46. The second inlet 56 communicates core airflow 36 to the second combustion space and the center inlet 58 communicates core airflow 36 to the center combustion space 44. The inlets 54, 56 and 58 are open to the chamber 34 and inlet airflow 76 into the corresponding combustion spaces 44, 46, and 48 is controlled by movement of the pistons 50, 52.

An exhaust outlet assembly 65 communicates the high energy exhaust gas flow 38 to the turbine section 28. The generated gases 78 within the combustion chamber 34 are combined in an exhaust manifold 68 and communicated as the combined exhaust gas flow 38 to the turbine section 28. A first outlet 60, a second outlet 62 and a center outlet 64 are provided in communication with a corresponding one of the first combustion space 46, second combustion space 48 and center combustion space 44. The outlets 60, 62 and 64 are open and selectively blocked and uncovered based on a position of the pistons 50, 52.

The fuel system 32 communicates fuel flow 80 to each of a first injector 70, a second injector 72 and a center injector 74. The first injector 70 communicates a fuel flow to the first combustion space 46. The second injector 72 communicates fuel to the second combustion space 48 and the center injector communicates fuel to the center combustion space 44. The injectors 70, 72 and 74 are controlled by a controller 86 to inject fuel at a predefined time into the corresponding combustion space 44, 46, and 48.

A first sensor assembly 82 is arranged to provide information indicative of a position of the first piston 50 to the controller 86. A second sensor assembly 84 is arranged to provide information indicative of a position of the second piston 52. The sensor assemblies 82, 84 may be proximity sensors, pressure sensors or any other sensor system that is capable of providing information to the controller 86 that is indictive of a position of the corresponding piston 50, 52 within the chamber 34.

The example controller 86 includes, among other possible devices, a processor 90 and a memory device 88. The controller 86 relates to a device and system for performing necessary computing or calculation operations for operation of the combustor assembly 26. The controller 86 may be specially constructed for operation of the combustor assembly 26, or it may comprise at least a general-purpose computer selectively activated or reconfigured by software instructions stored in the memory device 88. The controller 86 may further be part of full authority digital engine control (FADEC) or an electronic engine controller (EEC).

The disclosed memory device 88 may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). Software instructions in the memory device 88 may include one or more separate programs, each of which includes an ordered listing of executable instructions for implementing logical functions. Software in memory, in whole or in part, is read by the processor 90, and executed to operate the combustor assembly 26.

The example controller 86 includes all devices that operate to communicate with the combustor assembly 26 to generate the desired exhaust gas flow 38 based on a thrust setting 100. The controller 86 governs output exhaust gas flow 38 by controlling fuel flow through of the fuel injectors 70, 72 and 74 into a corresponding one of the combustion spaces 44, 46 and 48. The controller 86 is programed to control fuel flow through the first injector 70, the second injector 72 and the center injector 74 to inject fuel into a corresponding one of the first combustion space 46, the second combustion space 48 and the center combustion space 44. Timing of fuel injection provides control over the oscillation of the pistons 50, 52 within the combustion chamber 34, and thereby the amount of exhaust gas flow generated.

Figure 3:
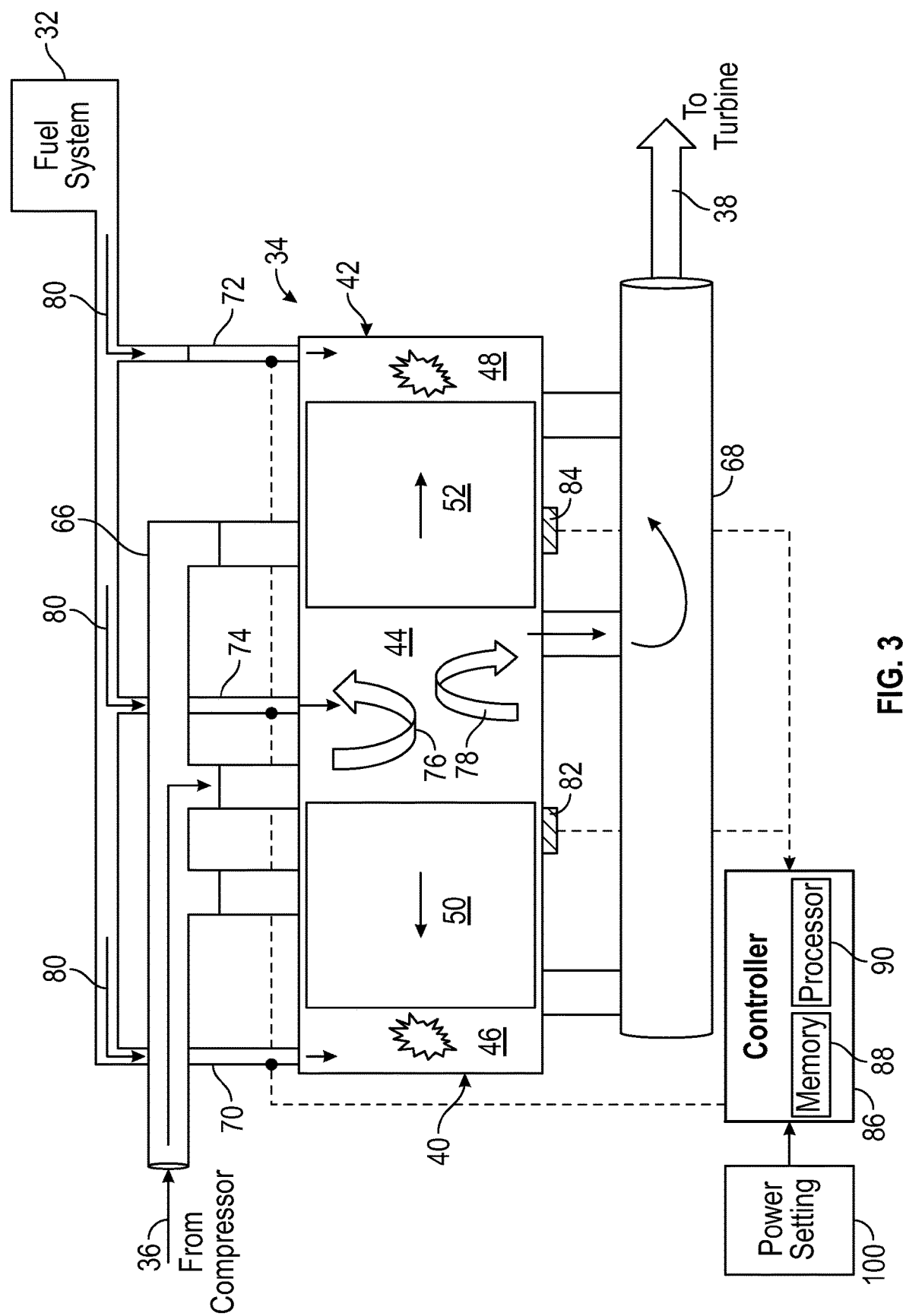
FIG. 3 is another schematic cross-sectional view of the example combustion chamber.

Referring to FIG. 3, with continued reference to FIG. 2, in one disclosed operational embodiment, the exhaust gas flow 38 is produced through two ignitions for each stroke of the pistons 50, 52. FIG. 2 illustrates a first combustion in the center combustion space 44. Combustion is initiated by heat generated by compression of the inlet airflow 76 between the pistons 50, 52. Fuel 80 is injected into the center combustion space 44 at a predefined time that produces an ignition of the fuel 80. Control of the time and quantity of fuel injected into the center combustion space 44 as the pistons 50, 52 move toward each other provides for control of production of the exhaust gas flow 38.

In this example as shown in FIG. 2, the pistons 50, 52 are moving toward each other to compress the inlet airflow 76 within the center combustion space 44. The compression of the inlet airflow 76 raises the temperature to a level where injected fuel will ignite. The fuel 80 is injected based on the position of the pistons 50, 52 and the pressure and temperature within the center combustion space 44.

As the pistons 50, 52 move toward each other, compressed inlet airflow 76 flows into the first and second combustion spaces 46, 48. Concurrently, exhaust gas flow 78 is exhausted through corresponding exhaust outlets 60, 62 into the exhaust manifold 68. The separate gas flows 78 from the different combustion spaces 46, 48 mix into the combined gas flow 38 communicated to the turbine section 28.

Compression of the inlet air within the center combustion space 44 heats the air to a temperature that ignites the fuel 80. The fuel 80 injected into the center combustion space 44 ignites and pushes the pistons 50, 52 outwards toward corresponding first and second ends 40, 42 as is shown in FIG. 3.

As the pistons 50, 52 move toward respective ends 40, 42, the air present in the respective combustion spaces 46, 48 is compressed and heated. At the same time, compressed inlet airflow 76 is communicated into the center combustion space 44 and exhaust gas 78 communicated into the exhaust manifold 68.

Fuel injected into the first and second combustion spaces 46, 48 ignites to generate the expanding exhaust gas flow and drive the pistons 50, 52 back toward each other to repeat the cycle as is shown in FIG. 2.

Referring to FIGS. 4, 5 and 6, an example combustion cycle is illustrated schematically. The disclosed example combustion cycle generates the gas flow 78 twice for each cycle of the pistons 50, 52 within the chamber 34. In this disclosed embodiment, a first set of inlets 92 are provided to communicate inlet airflow 76 from the compressor section 24 to the first combustion space 46. A second set of inlets 102 communicate inlet airflow 76 into the second combustion space 48. A center set of inlets 96 provide for communication of inlet airflow 76 into the center combustion space 44.

A first set of outlets 94 provide for exhausting of the generated hot gas flow 78 into the exhaust manifold 68. A second set of outlets 104 provide for exhausting the gas flow 78 from the second combustion space 48. A center set of outlets 98 provide for exhausting of the generated gas flow from the center combustion space 44. Each of the inlets 92, 96 and 102 and the outlets 94, 98 and 104 are open to the corresponding combustion space 44, 46, and 48.

Flow into and out of any of the combustion spaces 44, 46, and 48 is controlled by a position of the pistons 50, 52. As the pistons 50, 52 cycle back and forth within the chamber 34, some of the inlets 92, 96 and 104 is uncovered while others are blocked. The inlet airflow 76 flows automatically through the corresponding inlet 92, 96 and 102 when uncovered by movement of a corresponding piston 50, 52. Exhaust flow 78 (FIG. 5) out of the corresponding combustion space 44, 46 and 48 is also provided upon movement of the pistons 50, 52 to uncover a corresponding outlet 94, 98 and 104. Accordingly, no valving is utilized in controlling the intake of the inlet airflow 76 and the exhausting of the generated exhaust gas flow 78.

Cycling of the pistons 50, 52 is controlled by timing the injection of fuel 80 into a corresponding one of the combustion spaces 44, 46, 48. Injection of fuel 80 earlier in a compression stroke reduces pressure and thereby emissions. Injection of fuel 80 later in the compression stroke provides a higher pressure. Moreover, more frequent injection of fuel 80 will speed up cycling of the pistons 50 and thereby provide an increased amount of the combined exhaust gas flow 78. Slowing of the frequency of injection of fuel 80 will provide a corresponding slowing of cycling of the pistons 50.

In a disclosed example operational embodiment, fuel 80 injected into the center combustion space 44 ignites once heat from compression of the inlet core airflow 76 reaches the fuel ignition temperature. Compression is provided as the pistons 50, 52 move toward each other and block the corresponding ones of the inlets 96 and the outlets 98. As the center inlets 96 and outlets 98 are blocked, the inlets 92, 102 and outlets 94, 104 are uncovered to enable compressed core airflow 76 into the combustion space and provide exhaust flow out through outlets 94 and 104 as is illustrated in FIG. 4.

Upon combustion in the center combustion space 44, the pistons 50, 52 are driven apart toward the corresponding one of the first and second combustion spaces 46, 48 as is shown schematically in FIG. 5. As the pistons 50, 52 move to compress air in the first and second combustion spaces 46, 48, the center inlets 96 and outlets 98 are uncovered and core airflow 76 flows in and the exhaust gas flow is exhausted.

The pistons 50, 52 continue movement toward the corresponding ends 40, 42 until the core airflow is compressed such that the ignition temperature of the fuel 80 is reached and the injected fuel is ignited. The ignited fuel 80 drives the pistons 50, 52 back toward each other to begin the cycle again with combustion in the center combustion space 44.

Figure 7:
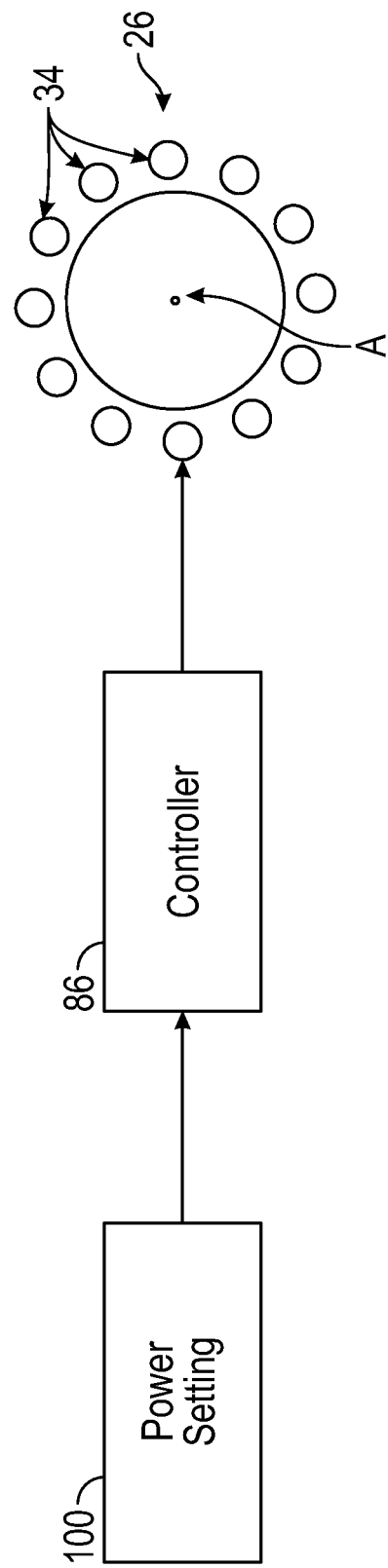
FIG. 7 is schematic view of an example combustor section embodiment.

Referring to FIG. 7, with continued reference to FIG. 1, an example combustion assembly 26 embodiment is shown schematically looking along the engine axis A. The combustion assembly 26 includes a plurality of combustion chambers 34 arranged about the engine longitudinal axis A. Each of the combustion chambers 34 may generate an exhaust gas flow that is combined and communicated to the turbine section 28. It should be appreciated that although a specific number of combustion chambers 34 are shown by way of example, other numbers and combinations of combustion chambers 34 may be utilized and are within the contemplation and scope of this disclosure.

The controller 86 is provided to control operation of the combustor assembly 26 based on the input engine power setting 100. The controller 86 is configured to adjust the amount of exhaust gases produced by selectively activating, or deactivating specific some of the combustion chambers 34. The example controller 86 is further programmed to control operation of each of the plurality of combustion chambers 34 by activating and deactivating select ones of the plurality of combustion chambers 34 to generate a predefined amount of the high energy gas flow.

A combustor assembly 26 for a turbine engine according to a disclosed example embodiment includes, among other possible things, at least one combustion chamber 34 that is closed at a first end 40 and a second end 42, a first piston 50 and a second piston 52 that are moveable within the combustion chamber 34. A first combustion space 46 is defined between the first end 40 and the first piston 50, a second combustion space 48 is defined between the second end 42 and the second piston 52 and a center combustion space 44 is defined between the first piston 50 and the second piston 52. An air inlet assembly 55 is provided where an inlet airflow 76 is communicated to the first combustion space 46, the second combustion space 48 and the center combustion space 44. A first injector 70 is configured to inject fuel into the first combustion space 46, a second injector 72 is configured to inject fuel in to the second combustion space 48, and a center injector 74 is configured to inject fuel into the center combustion space 44. An exhaust outlet assembly 65 receives a high energy exhaust gas flow that is generated in each of the to the first combustion space 46, the second combustion space 48 and the center combustion space 44.

In a further embodiment of the foregoing combustor assembly 26, the air inlet assembly 55 includes a first set of inlets 54 that communicate air to the first combustion space 46, a second set of inlets 56 that communicate air to the second combustion space 48 and a center set of inlets 58 that communicate air to the center combustion space 44.

In a further embodiment of any of the foregoing combustor assemblies, the exhaust outlet assembly 65 includes a first set of outlets 60 that are in communication with the first combustion space 46, a second set of outlets 62 that are in communication with the second combustion space 48 and a center set of outlets 64 that are in communication with the center combustion space 44.

In a further embodiment of any of the foregoing example embodiments, the combustor assembly 26 includes an exhaust manifold 68 where the high energy exhaust gas flow from each of the first set of outlets 60, the second set of outlets 62 and the center set of outlets 64 are combined.

In a further embodiment of any of the foregoing example embodiments, the combustor assembly 26 includes a controller 86 that is programed to control fuel flow through the first injector 70, the second injector 72 and the center injector 74 to inject fuel into a corresponding one of the first combustion space 46, second combustion space 48 and center combustion space 44.

In a further embodiment of any of the foregoing example embodiments, the combustor assembly 26 includes at least one sensor assembly 82 for measuring a position of the first piston 50 and a position of the second piston 52 within the combustion chamber 34 and generating a signal that is indicative of the measured position of the first piston 50 and the second piston 52 for communication to the controller 86.

In a further embodiment of any of the foregoing combustor assemblies, the at least one combustion chamber 34 includes a plurality of combustion chambers 34.

In a further embodiment of any of the foregoing example embodiments, the combustor assembly 26 includes a controller 86 that is programmed to control operation of each of the combustor assembly by selectively activating and deactivating select ones of the plurality of combustion chambers 34 to generate a predefined amount of the high energy gas flow.

In a further embodiment of any of the foregoing combustor assemblies, the controller 86 is programmed to activate and deactivate select ones of the plurality of combustion chambers 34 in response to a predefined engine power setting.

A turbine engine assembly 20 according to another disclosed example embodiment includes, among other possible things, a compressor section 24 where inlet air is compressed to generate a core airflow 36, and a combustor assembly 26 where the core airflow 36 is mixed with fuel and ignited to generate a high energy exhaust gas flow. The combustor assembly 26 includes at least one combustion chamber 34 that is closed at a first end 40 and a second end 42, and a first piston 50 and a second piston 52 that are both moveable within the combustion chamber 34. A first combustion space 46 is defined between the first end 40 and the first piston 50, a second combustion space 48 is defined between the second end 42 and the second piston 52 and a center combustion space 44 is defined between the first piston 50 and the second piston 52. A turbine section 28 receives the high energy exhaust gas flow from the combustor assembly 26 where it is expanded to generate shaft power.

In a further embodiment of the foregoing turbine engine assembly 20, including a first injector 70 to inject fuel into the first combustion space 46, a second injector 72 to inject fuel into the second combustion space 48, and a center injector 74 to inject fuel into the center combustion space 44.

In a further embodiment of any of the foregoing example embodiments, the turbine engine assembly 20 includes an air inlet assembly 55 where the core airflow 36 from the compressor section 24 is communicated to the first combustion space 46, the second combustion space 48, and the center combustion space 44, and an exhaust outlet assembly 65 for communicating the high energy exhaust gas flow to the turbine section 28.

In a further embodiment of any of the foregoing turbine engine assemblies, the exhaust outlet assembly 65 includes a first set of outlets 60 that are in communication with the first combustion space 46, a second set of outlets 62 that are in communication with the second combustion space 48 and a center set of outlets 64 that are in communication with the center combustion space 44.

In a further embodiment of any of the foregoing example embodiments, the turbine engine assembly includes a controller 86 that is programed to control fuel flow through the first injector 70, the second injector 72 and the center injector 74 to inject fuel into a corresponding one of the first combustion space 46, the second combustion space 48 and the center combustion space 44.

In a further embodiment of any of the foregoing example embodiments, the turbine engine assembly includes at least one sensor assembly for measuring a position of the first piston 50 and a position of the second piston 52 within the combustion chamber 34 and generating a signal indicative of the measured position of each of the first piston 50 and the second piston 52 for communication to the controller 86.

In a further embodiment of any of the foregoing turbine engine assemblies, the at least one combustion chamber 34 includes a plurality of combustion chambers 34.

In a further embodiment of any of the foregoing example embodiments, the turbine engine assembly includes a controller 86 that is programmed to control operation of the combustor assembly 26 by activating and deactivating select ones of the plurality of combustion chambers 34 to generate a predefined amount of the high energy gas flow.

A method of operating a turbine engine assembly 20 according to a disclosed example embodiment includes, among other possible things, communicating a core airflow 36 to a combustion chamber 34 between a first piston 50 and a second piston 52, compressing the core airflow 36 within the combustion chamber 34 in a center combustion space 44 between the first piston 50 and the second piston 52, injecting fuel into the center combustion space 44 at a predefined time to ignite the fuel and generate a first high energy exhaust gas flow and drive the first piston 50 and the second piston 52 apart from each other toward a corresponding first closed end 40 and second closed end 42, compressing the core airflow 36 within a first combustion space 46 with the first piston 50 and within a second combustion space 48 with the second piston 52, injecting fuel into the first combustion space 46 and the second combustion space 48 at a predefined time to ignite the fuel and generate a second high energy exhaust gas flow, and communicating the first high energy gas flow and the second high energy gas flow to a turbine section 28 to generate power.

In a further embodiment of the foregoing example embodiment, the method includes measuring a position of each of the first piston 50 and the second piston 52 within the combustion chamber 34 and injecting fuel into the first combustion space 46, the second combustion space 48 and the center combustion space 44 based at a predefined time on the measured position.

In a further embodiment of any of the foregoing example embodiments, the method further includes selectively activating and deactivating a plurality of combustion chambers 34 with a controller 86 that is programmed to tailor generation of exhaust gas flow to a predefined engine operating condition.

Although depicted as a turbofan turbine engine in the disclosed non-limiting embodiment, it should be understood that the concepts described herein are not limited to use with turbofans as the teachings may be applied to other types of turbine engines.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A combustor assembly for a turbine engine, the combustor assembly comprising:

at least one combustion chamber closed at a first end and at a second end;

a first piston and a second piston moveable independent of each other within the combustion chamber, wherein a first combustion space is defined between the first end and the first piston, a second combustion space is defined between the second end and the second piston and a center combustion space is defined between the first piston and the second piston;

an air inlet assembly where an inlet airflow is communicated to the first combustion space, the second combustion space and the center combustion space;

a first injector configured to inject fuel into the first combustion space;

a second injector configured to inject fuel in to the second combustion space;

a center injector configured to inject fuel into the center combustion space, wherein the center combustion space is configured to combust a fuel air mixture to drive the first piston and the second piston apart toward a corresponding one of the first combustion space and the second combustion space; and an exhaust outlet assembly for receiving an exhaust gas flow generated in each of the first combustion space, the second combustion space and the center combustion space.

2. The combustor assembly as recited in claim 1, wherein the air inlet assembly comprises a first set of inlets communicating air to the first combustion space, a second set of inlets communicating air to the second combustion space and a center set of inlets communicating air to the center combustion space.

3. The combustor assembly as recited in claim 2, wherein the exhaust outlet assembly comprises a first set of outlets in communication with the first combustion space, a second set of outlets in communication with the second combustion space and a center set of outlets in communication with the center combustion space.

4. The combustor assembly as recited in claim 3, wherein the exhaust outlet assembly includes an exhaust manifold where the exhaust gas flow from each of the first set of outlets, the second set of outlets and the center set of outlets are combined.

5. The combustor assembly as recited in claim 3, including a controller programed to control fuel flow through the first injector, the second injector and the center injector to inject fuel into a corresponding one of the first combustion space, the second combustion space and the center combustion space.

6. The combustor assembly as recited in claim 5, including at least one sensor assembly for measuring a position of the first piston and a position of the second piston within the at least one combustion chamber and for generating a signal indicative of the measured position of the first piston and the second piston for communication to the controller.

7. The combustor assembly as recited in claim 1, wherein the at least one combustion chamber comprises a plurality of combustion chambers.

8. The combustor assembly as recited in claim 7, including a controller programmed to control operation of the combustor assembly by selectively activating and deactivating select ones of the plurality of combustion chambers to generate a predefined amount of the exhaust gas flow.

9. The combustor assembly as recited in claim 8, wherein the controller is programmed to activate and deactivate select ones of the plurality of combustion chambers in response to a predefined engine power setting.

10. A turbine engine assembly comprising:

a compressor section where inlet air is compressed to generate a core airflow;

a combustor assembly where the core airflow is mixed with fuel and ignited to generate an exhaust gas flow, wherein the combustor assembly includes at least one combustion chamber closed at a first end and at a second end and a first piston and a second piston that are both movable independent of each other within the combustion chamber, wherein a first combustion space is defined between the first end and the first piston, a second combustion space is defined between the second end and the second piston and a center combustion space is defined between the first piston and the second piston, wherein the center combustion space is configured to combust a fuel air mixture to drive the first piston and the second piston apart toward a corresponding one of the first combustion space and the second combustion space; and a turbine section where the exhaust gas flow from the combustor assembly is expanded to generate shaft power.

11. The turbine engine assembly as recited in claim 10, including a first injector to inject fuel into the first combustion space, a second injector to inject fuel into the second combustion space, and a center injector to inject fuel into the center combustion space.

12. The turbine engine assembly as recited in claim 11, including an air inlet assembly where the core airflow from the compressor section is communicated to the first combustion space, the second combustion space and the center combustion space, and an exhaust outlet assembly for communicating the exhaust gas flow to the turbine section.

13. The turbine engine assembly as recited in claim 12, wherein the exhaust outlet assembly comprises a first set of outlets in communication with the first combustion space, a second set of outlets in communication with the second combustion space and a center set of outlets in communication with the center combustion space.

14. The turbine engine assembly as recited in claim 13, including a controller programed to control fuel flow through the first injector, the second injector and the center injector to inject fuel into a corresponding one of the first combustion space, the second combustion space and the center combustion space.

15. The turbine engine assembly as recited in claim 14, including at least one sensor assembly for measuring a position of the first piston and the second piston within the at least one combustion chamber and generating a signal indicative of the measured position of each of the first piston and the second piston for communication to the controller.

16. The turbine engine assembly as recited in claim 15, wherein the at least one combustion chamber comprises a plurality of combustion chambers.

17. The turbine engine assembly as recited in claim 16, including a controller programmed to control operation of the combustor assembly by activating and deactivating select ones of the plurality of combustion chambers to generate a predefined amount of the exhaust gas flow.

* * * * *